(12) United States Patent
Johnson (10) Patent No.: US 7,904,355 B1
(45) Date of Patent: Mar. 8, 2011

(54) SYSTEMS AND METHODS FOR A REVENUE CAUSALITY ANALYZER

(75) Inventor: Jeffrey D. Johnson, San Francisco, CA (US)

(73) Assignee: Vendavo, Inc., Palo Alto, CA (US)

( * ) Notice: Subject to any disclaimer, the term of this patent is extended or adjusted under 35 U.S.C. 154(b) by 323 days.

(21) Appl. No.: 12/027,193

(22) Filed: Feb. 6, 2008

Related U.S. Application Data (60) Provisional application No. 60/890,777, filed on Feb. 20, 2007.

(51) Int. Cl.
*G07B 17/00* (2006.01)
(52) U.S. Cl. ............................................ 705/30; 705/36
(58) Field of Classification Search .................. 705/30, 705/36; 709/223
See application file for complete search history.

(56) References Cited

U.S. PATENT DOCUMENTS

| | | |
|---|---|---|
| 3,806,711 A | 4/1974 | Cousins, Jr. |
| 5,053,957 A | 10/1991 | Suzuki |
| 5,224,034 A | 6/1993 | Katz et al. |
| 5,461,708 A | 10/1995 | Kahn |
| 5,497,489 A | 3/1996 | Menne |
| 5,537,590 A | 7/1996 | Amado |
| 5,590,269 A | 12/1996 | Kruse et al. |
| 5,670,984 A | 9/1997 | Robertson et al. |
| 5,689,287 A | 11/1997 | Mackinlay et al. |
| 5,710,887 A | 1/1998 | Chelliah et al. |
| 5,740,448 A | 4/1998 | Gentry et al. |
| 5,758,327 A | 5/1998 | Gardner et al. |
| 5,808,894 A | 9/1998 | Wiens et al. |
| 5,870,717 A | 2/1999 | Wiecha |
| 5,873,069 A | 2/1999 | Reuhl et al. |
| 5,878,400 A | 3/1999 | Carter, III |
| 5,946,666 A | 8/1999 | Nevo et al. |
| 6,009,407 A | 12/1999 | Garg |
| 6,075,530 A | 6/2000 | Lucas et al. |
| 6,078,901 A | 6/2000 | Ching |

(Continued)

FOREIGN PATENT DOCUMENTS

WO    WO 99/60486    11/1999

(Continued)

OTHER PUBLICATIONS

Markusen,Ann, A market for jobs approach for analyzing the competition for capital, National Tax Association, pp. 30-35.*

(Continued)

*Primary Examiner* — Matthew S Gart
*Assistant Examiner* — Talia Crawley
(74) *Attorney, Agent, or Firm* — Kang S. Lim (57) ABSTRACT

A revenue causality analyzer that provides attribution of causality effects for changes in revenue. The analyzer includes a selector for selecting a reference time period and a comparison time period, a receiver configured to receive transaction data including pricing data and volume data about the products at reference and comparison times, a preparer that includes a missing data exchanger and data error corrector, an attributor for attributing causality effects including a price effect, a volume effect, a mix effect an exchange effect, a cost effect, a dividend effect, a loss effect, and an inventory appreciation effect, by analyzing transaction data through a causality equation; and an output. Price effect sums the product of change in price and volume of the products across the products and currencies. Volume effect multiplies change in volume by the revenue per product sold. Mix effect multiplies percent revenue change by the volume of products sold.

18 Claims, 9 Drawing Sheets

U.S. PATENT DOCUMENTS

| | | | |
|---|---|---|---|
| 6,151,031 A | 11/2000 | Atkins et al. | |
| 6,211,880 B1 | 4/2001 | Impink, Jr. | |
| 6,320,586 B1 | 11/2001 | Plattner et al. | |
| 6,336,094 B1* | 1/2002 | Ferguson et al. | 705/1.1 |
| 6,434,533 B1 | 8/2002 | Fitzgerald | |
| 6,536,037 B1* | 3/2003 | Guheen et al. | 717/151 |
| 6,553,350 B2 | 4/2003 | Carter | |
| 6,665,577 B2 | 12/2003 | Onyshkevych et al. | |
| 6,678,695 B1 | 1/2004 | Bonneau et al. | |
| 6,785,664 B2 | 8/2004 | Jameson | |
| 6,801,201 B2 | 10/2004 | Escher | |
| 6,812,926 B1 | 11/2004 | Rugge | |
| 6,851,604 B2 | 2/2005 | Girotto et al. | |
| 6,856,967 B1 | 2/2005 | Woolston et al. | |
| 6,856,972 B1* | 2/2005 | Yun et al. | 705/36 R |
| 6,907,403 B1 | 6/2005 | Klein et al. | |
| 6,988,076 B2 | 1/2006 | Ouimet | |
| 7,015,912 B2 | 3/2006 | Marais | |
| 7,046,248 B1 | 5/2006 | Perttunen | |
| 7,076,463 B1 | 7/2006 | Boies et al. | |
| 7,080,026 B2 | 7/2006 | Singh et al. | |
| 7,092,929 B1 | 8/2006 | Dvorak et al. | |
| 7,133,848 B2 | 11/2006 | Phillips et al. | |
| 7,149,716 B2 | 12/2006 | Gatto | |
| 7,155,510 B1 | 12/2006 | Kaplan | |
| 7,218,325 B1 | 5/2007 | Buck | |
| 7,233,928 B2 | 6/2007 | Huerta et al. | |
| 7,254,584 B1 | 8/2007 | Addison, Jr. | |
| 7,308,421 B2 | 12/2007 | Raghupathy et al. | |
| 7,315,835 B1 | 1/2008 | Takayasu et al. | |
| 7,343,355 B2 | 3/2008 | Ivanov et al. | |
| 7,360,697 B1 | 4/2008 | Sarkar et al. | |
| 2001/0003814 A1 | 6/2001 | Hirayama et al. | |
| 2002/0007323 A1 | 1/2002 | Tamatsu | |
| 2002/0032610 A1 | 3/2002 | Gold et al. | |
| 2002/0042782 A1 | 4/2002 | Albazz et al. | |
| 2002/0052817 A1 | 5/2002 | Dines et al. | |
| 2002/0059229 A1 | 5/2002 | Natsumeda et al. | |
| 2002/0072993 A1 | 6/2002 | Sandus et al. | |
| 2002/0099596 A1 | 7/2002 | Geraghty | |
| 2002/0107819 A1 | 8/2002 | Ouimet | |
| 2002/0116348 A1 | 8/2002 | Phillips et al. | |
| 2002/0128953 A1 | 9/2002 | Quallen et al. | |
| 2002/0152133 A1 | 10/2002 | King et al. | |
| 2002/0152150 A1 | 10/2002 | Cooper et al. | |
| 2002/0156695 A1 | 10/2002 | Edwards | |
| 2002/0165726 A1 | 11/2002 | Grundfest | |
| 2002/0165760 A1 | 11/2002 | Delurgio et al. | |
| 2002/0178077 A1 | 11/2002 | Katz et al. | |
| 2002/0188576 A1 | 12/2002 | Peterson et al. | |
| 2002/0194051 A1 | 12/2002 | Hall et al. | |
| 2003/0009411 A1 | 1/2003 | Ram et al. | |
| 2003/0028451 A1 | 2/2003 | Ananian | |
| 2003/0033240 A1 | 2/2003 | Balson et al. | |
| 2003/0095256 A1 | 5/2003 | Cargill et al. | |
| 2003/0110066 A1 | 6/2003 | Walser et al. | |
| 2003/0115129 A1 | 6/2003 | Feaver et al. | |
| 2003/0126053 A1 | 7/2003 | Boswell et al. | |
| 2003/0130883 A1 | 7/2003 | Schroeder et al. | |
| 2003/0167209 A1 | 9/2003 | Hsieh | |
| 2003/0191723 A1 | 10/2003 | Foretich et al. | |
| 2003/0191832 A1* | 10/2003 | Satyavolu et al. | 709/223 |
| 2003/0195810 A1 | 10/2003 | Raghupathy et al. | |
| 2003/0200185 A1 | 10/2003 | Huerta et al. | |
| 2003/0225593 A1 | 12/2003 | Ternoey et al. | |
| 2003/0229552 A1 | 12/2003 | Lebaric et al. | |
| 2004/0024715 A1 | 2/2004 | Ouimet | |
| 2004/0049470 A1 | 3/2004 | Ouimet | |
| 2004/0078288 A1 | 4/2004 | Forbis et al. | |
| 2004/0117376 A1 | 6/2004 | Lavin et al. | |
| 2004/0128225 A1 | 7/2004 | Thompson et al. | |
| 2004/0133526 A1 | 7/2004 | Shmueli et al. | |
| 2004/0193442 A1 | 9/2004 | Kimata et al. | |
| 2004/0267674 A1 | 12/2004 | Feng et al. | |
| 2005/0004819 A1 | 1/2005 | Etzioni et al. | |
| 2005/0096963 A1 | 5/2005 | Myr et al. | |
| 2005/0187852 A1* | 8/2005 | Hwang | 705/36 |
| 2005/0197857 A1 | 9/2005 | Avery | |
| 2005/0197971 A1 | 9/2005 | Kettner et al. | |
| 2005/0240601 A1* | 10/2005 | Lyons et al. | 707/100 |
| 2005/0256778 A1 | 11/2005 | Boyd et al. | |
| 2005/0267831 A1 | 12/2005 | Esary et al. | |
| 2005/0278227 A1 | 12/2005 | Esary et al. | |
| 2006/0004861 A1 | 1/2006 | Albanese et al. | |
| 2006/0031178 A1 | 2/2006 | Lehrman et al. | |
| 2006/0031179 A1 | 2/2006 | Lehrman | |
| 2006/0047574 A1 | 3/2006 | Sundaram et al. | |
| 2006/0069585 A1 | 3/2006 | Springfield et al. | |
| 2006/0241923 A1 | 10/2006 | Xu et al. | |
| 2007/0294192 A1 | 12/2007 | Tellefsen | |
| 2008/0059280 A1 | 3/2008 | Tellefsen et al. | |
| 2008/0126264 A1 | 5/2008 | Tellefsen et al. | |

FOREIGN PATENT DOCUMENTS

| | | |
|---|---|---|
| WO | WO 00/29995 | 5/2000 |
| WO | WO 2005/119500 | 12/2005 |

OTHER PUBLICATIONS

Vasigh,Bijan; Gorjidooz,Javad, Productivity Analysis of Public and Private Airports: A causal Investigation, Journal of Air Transportation, vol. 11, num 3, pp. 144-163.*

"PCT International Search Report and the Written Opinion of the International Searching Authority", Application No. PCT/US 07/23740, mailed Mar. 3, 2008.

"PCT International Search Report", Application No. PCT/US07/10754, mailed Nov. 7, 2007.

"PCT International Search Report", Application No. PCT/US07/11571, mailed Jan. 7, 2008.

"PCT International Search Report", Application No. PCT/US05/14879, mailed Apr. 16, 2007.

"Written Opinion of the International Searching Authority", Application No. PCT/US05/14879, mailed Apr. 16, 2007.

"Written Opinion of the International Searching Authority", Application No. PCT/US05/14981, mailed Nov. 27, 2006.

"Written Opinion of the International Searching Authority", Application No. PCT/US05/14883, mailed Oct. 3, 2006.

Origin 7.0 Help (including 21 sheets of screen shots), 2000.

Microsoft Excel 2000, 1985-1999.

Marn, Michael V. and Robert L. Rosiello, "Managing Price, Gaining Profit," Harvard Business Review, pp. 84-93 (Sep.-Oct. 1992).

"Net Commerce Launches Its FastTrack Configurator and FasPac Catalog Utility", Apr. 17, 2001, Business Wire. New York. p. 1.

"SPEX Assesses B2C and B2B Electronic Commerce Software Maturity", PR Newswire. New York: Apr. 28, 2000, p. 1.

Murphy, Diane R., "The Exciting Role of the Credit Manager in the Expanding E-Commerce Marketplace", Business Credit, vol. 10, No. 9, p. 64, Oct. 2000.

Spanbauer, Scott et al., "You've got E-mail", PC World, vol. 16, No. 6, p. 135, Jun. 1998.

Beidl, Richard et al., "The Coming of Risk-Based Pricing: Part Two", Oct. 2000, Mortgage Banking, Washington, vol. 61, Issue 1.

Kenton, Kenton B. et al., "Planning a Revenue Stream System in an E-Business Environment", 2001, Industrial Management—Data Systems, p. 406-413, 8/9;ABI/Inform Global.

"eMerchant, magic Software's Powerful New Business-to-Business E-commerce Solution. Wins 'Best of Show' at Internet Commerce Expo", Apr. 1, 1999, Business Wire, (2 pages).

Bourne, Humphrey, "Pricing the Strategic Implications", Mar. 1999, Management Accounting. Magazine for Chartered Management Accountants; vol. 77, Issue 3.

"PCT International Search Report and the Written Opinion of the International Searching Authority", Application No. PCT/US07/18663, mailed Aug. 26, 2008.

Walker, Kenton B. et al., "Planning a Revenue Stream System in an E-Business Environment", 2001, Industrial Management—Data Systems, p. 406-413, 8/9;ABI/Inform Global.

Bhattacharya, Anindya et al. "Using 'smart' pricing to increase profits and maximize customer satisfaction", Aug. 2001, The National Public Accountant; vol. 25, Issue 6.

Kim, Byung-Do et al., "Modeling the Distribution of Price Sensitivity and Implications for Optimal Retail Pricing", Jul. 1995, Journal of Business & Economic Statistics; vol. 13, Issue 3.

Levy, Michael et al., "Emerging Trends in Retail Pricing Practice: Implications for Research", 2004, Journal of Retailing; vol. 80.

Hung, Chao-Shun, "Conjectural Variations and Market Performance in a Differentiated Product Industry", Dec. 1991, Atlantic Economic Journal; vol. 19, Issue 4.

Dawes, John, "Assessing the Impact of a Very Successful Price Promotion on Brand, Category and Competitor Sales", 2004, The Journal of Product and Brand Management; vol. 13, Issue 5.

Leeflang, Peter S. H. et al., "Marketing Decisions Based on Econometric Models", Spring 2002, Marketing Research; vol. 14, Issue 1.

Dawes, John, "Price Changes and Defection Levels in a Subscription-Type Market: Can An Estimation Model Really Predict Defecation Levels?", The Journal of Services Marketing; vol. 18, Issue 1.

Lucke, Dorothea et al., "A Note on R&D and Price Elasticity of Demand," Nov. 2005, Jahrbucher fur Nationalokonomie and Statistik; vol. 225, Issue 6.

Caru, Antonella et al. "Profitability and Customer Satisfaction in Services: An Integrated Perspective Between Marketing and Cost Management Analysis", 1999, International Journal of Service Industry Management; vol. 10, Issue 2.

Tollefson, John O. et al., "Aggregation Criteria in Normative Market Segmentation Theory", Aug. 1978, Journal of Marketing Research; vol. 15.

Coulter, Keith S., "Decreasing Price Sensitivity Involving Physical Product Inventory: A Yield Management Application", 2001, The Journal of Product and Brand Management; vol. 10, Issue 5.

Mills, Don, "Oil Rises on Report Showing Gasoline Supply Decline", National Post, Ont; May 30, 2003.

Keenan, Faith, "The Price is Really Right," Business Week, Mar. 31, 2003.

Chan Choi, S., Desarbo, W. S., Harker, P. T. "Product Positioning under Price Competition." Feb. 1990. Management Science, vol. 36, Issue 2, pp. 175-199.

Kirschen, D. S., Strbac, G., Cumperayot, P., de Paiva Mendes, D. "Factoring the Elasticity of Demand in Electricity Prices." May 2000. IEEE Transactions on Power Systems, vol. 15, No. 2, pp. 612-617.

* cited by examiner

|  | Reference Time Period | | Comparison Time Period | |
|---|---|---|---|---|
| Product | Price | Volume | Price | Volume |
| A | $1 | 900 |  |  |
| B | $4 | 500 | $4 | 500 |
| C | $10 | 700 | $10 | 700 |
| D | $12 | 200 | $12 | 200 |
| E |  |  | $15 | 75 |
| F |  |  | $20 | 125 |

FIG. 4A

|  | Reference Time Period | | Comparison Time Period | |
|---|---|---|---|---|
| Product | Price | Volume | Price | Volume |
| A | $1 | 900 | $1 | 0 |
| B | $4 | 500 | $4 | 500 |
| C | $10 | 700 | $10 | 700 |
| D | $12 | 200 | $12 | 200 |
| E | $15 | 0 | $15 | 75 |
| F | $20 | 0 | $20 | 125 |

| Product Family | Revenue 2005 Q2 | Revenue 2005 Q1 | Delta | Price | Volume | Mix |
|---|---|---|---|---|---|---|
| Networking | $978,750 | $850,450 | $128,300 | $105,000 | -$52,500 | $75,800 |
| Memory | $625,350 | $425,675 | $199,675 | $20,500 | $150,000 | $29,175 |
| Microcontrollers | $1,045,500 | $1,075,350 | -$29,850 | $65,000 | -$45,250 | -$49,600 |
| Wireless | $760,725 | $624,400 | $136,325 | $20,575 | $78,550 | $37,200 |

Base revenue — Comparison revenue — Revenue difference — The sum of these effects explain the delta for each product family

SYSTEMS AND METHODS FOR A REVENUE CAUSALITY ANALYZER

BACKGROUND OF THE INVENTION

This invention relates generally to revenue causality analyzer system and method to provide fast and efficient analysis of revenue causality for price management and business management. More particularly, the present invention relates to a method for analyzing changes in revenue over two time periods to attribute the components causally responsible for the change in revenue.

Between two time periods revenues change. The difference in revenues between the time periods is the change in revenue. An understanding of change in revenue causality is very important to effective price management. As such, there is a desire to accurately be able to attribute changes in revenue to causal factors. Within this application causal factors may also be referred to as causal effects or causalities. These factors include changes in product pricing, changes in the volume of products sold, changes in product mix sold, changes in costs, changes in exchange rates, and any additional factors that may play a role in revenue changes.

When revenue change is due to only one causality factor, the causality analysis is very easily determined. However, when multiple factors are involved it traditionally has been difficult, if not impossible, to attribute the amount of change of revenue to the appropriate factors. Additionally, with the more products included in the system the more complex the analysis becomes.

Currently, human intuition must be utilized to make a rough estimation of the importance of each causal factor to the change in revenue. Alternatively, computer systems may be utilized that provide some measure of revenue causality attribution, however, these current systems either make gross estimations in their computation, or are intermittently able to analyze revenue causality. Additionally, these computations may be difficult and may require large processing resources to effectuate, especially when the system includes large numbers of products For the typical business, the above systems are still too inaccurate, unreliable, and intractable in order to be utilized effectively for price management and analysis. Businesses, particularly those involving large product sets, would benefit greatly from the ability to have accurate revenue causality characterization.

It is therefore apparent that an urgent need exists for an improved system and method for revenue causality analysis and attribution that is both accurate and efficient. This solution would replace current revenue analysis techniques with a more accurate system; thereby increasing effectiveness in downstream price management that utilizes the revenue analysis.

SUMMARY OF THE INVENTION

To achieve the foregoing and in accordance with the present invention, a method and system for a Revenue Causality Analyzer. Such a system is useful for a business to analyze revenue changes, and attribute those changes to causal effects. Such an analysis may be utilized by the business for price management.

One advantage of the present invention is that the revenue causality analyzer is capable of accurately attributing causality effects for changes in revenue quickly and efficiently. The revenue causality analyzer is useful in association with products, and comprises a selector for selecting a reference time period and a comparison time period, a receiver configured to receive transaction data including pricing data and volume data about the products at reference and comparison times, a preparer that includes a missing data exchanger and data error corrector, an attributor for attributing causality effects including a price effect, a volume effect, a mix effect, an exchange effect, a cost effect, a dividend effect, a loss effect, and an inventory appreciation effect, by analyzing transaction data through a causality equation; and an output.

The price effect comprises summing the product of the change in price for the products at the currencies by the volume of the products sold in the comparison time period across the products and currencies. The volume effect comprises the product of the change in volume by the revenue per product sold in the reference time period. The mix effect comprises the product of the percent revenue change by the volume of products sold in the comparison time period. The exchange effect comprises summing the product of the changes in price for the products at the comparison time in the currencies due to exchange rate difference and the volume of sales of the products at the comparison time period across products and currencies.

These and other features of the present invention will be described in more detail below in the detailed description of the invention and in conjunction with the following figures.

BRIEF DESCRIPTION OF THE DRAWINGS

In order that the present invention may be more clearly ascertained, one embodiment will now be described, by way of example, with reference to the accompanying drawings, in which.

DETAILED DESCRIPTION OF THE INVENTION

I. Overview of Revenue Causality Analysis

The present invention will now be described in detail with reference to several embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

Figure 1:
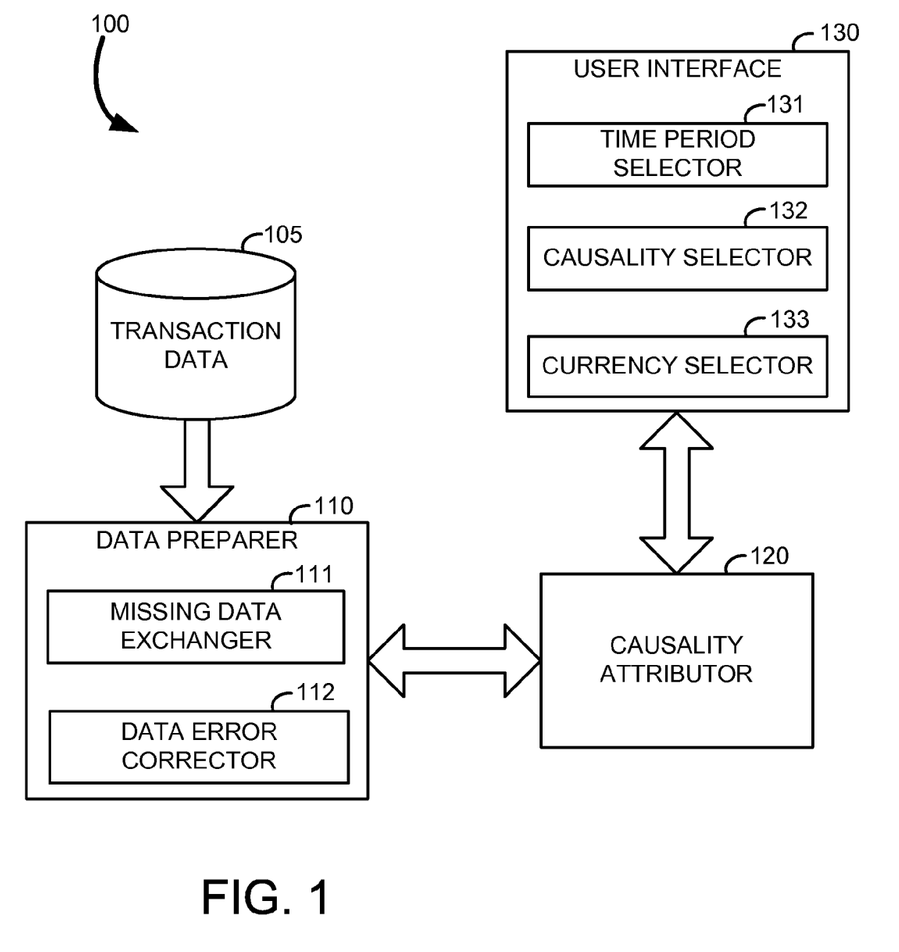
FIG. 1 shows a block diagram illustrating the revenue causality analyzer in accordance with an embodiment of the present invention.

To facilitate discussion, FIG. 1 shows a block diagram illustrating the Revenue Causality Analyzer 100 in accordance with an embodiment of the present invention. The Revenue Causality Analyzer 100 receives Transaction Data 105 via the Data Preparer 110. The Data Preparer 110 prepares Transaction Data 105 for use by the Causality Attributor 120. The Data Preparer 110 includes a Missing Data Exchanger 111, and a Data Error Corrector 112. The Missing Data Exchanger 111 replaces any missing data, and the Data Error Corrector 112 corrects errors in the data set.

The Data Preparer 110 is coupled to the Causality Attributor 120. The Causality Attributor 120 calculates the causality effects by utilizing causality equations. The Causality Attributor 120 couples to a User Interface 130. The User Interface 130 includes a Time Period Selector 131, a Causality Selector 132 and a Currency Selector 133. The Time Period Selector 131 enables the user to select time periods for comparison by the Causality Attributor 120. The Causality Selector 132 enables the user to select the causal effects of interest for analysis by the Causality Attributor 120. Lastly, the Currency Selector 133 enables the user to select for the currency of interest for analysis by the Causality Attributor 120.

Figure 2:
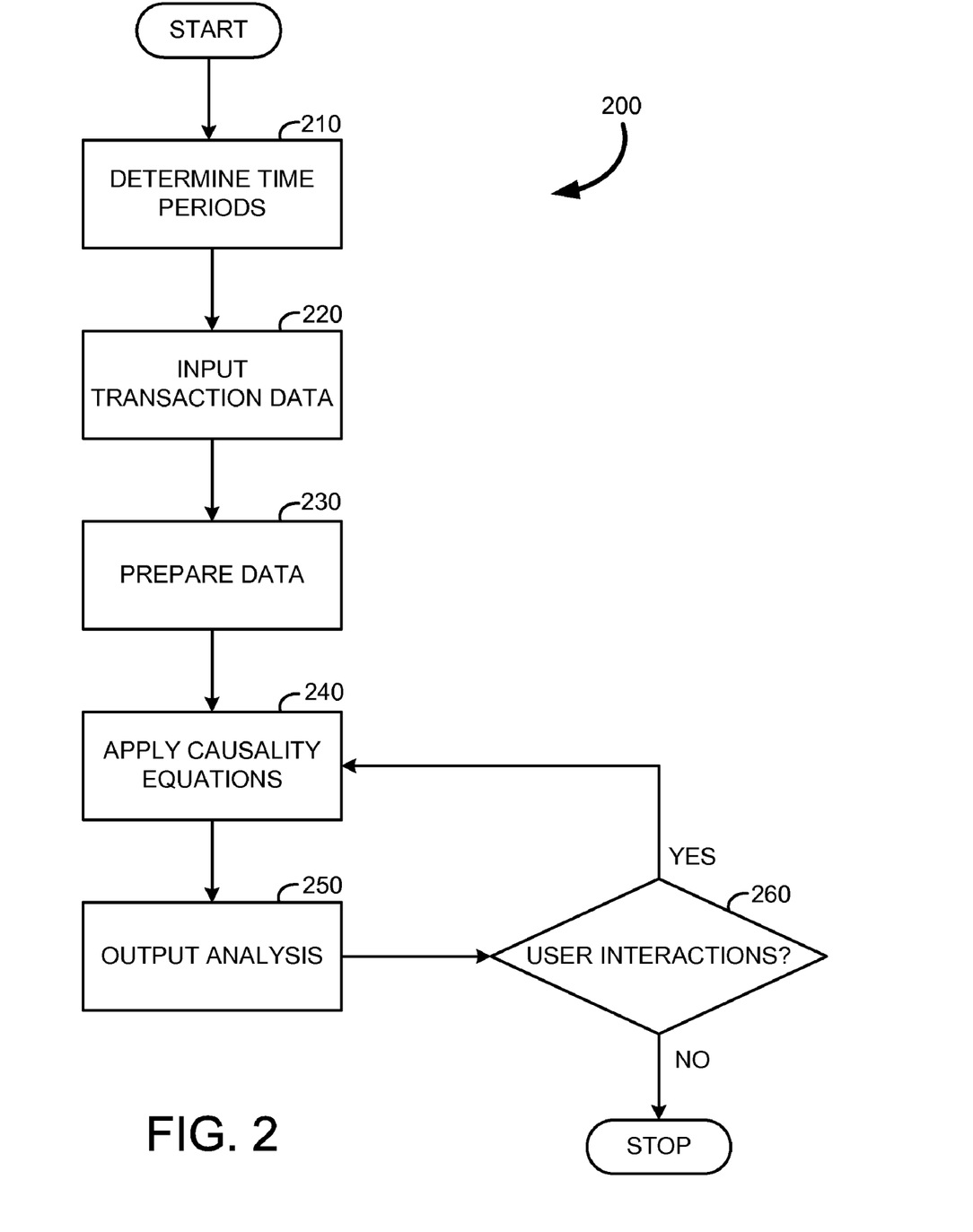
FIG. 2 shows a flow chart illustrating the process for analyzing revenue causality for the revenue causality analyzer of FIG. 1.

FIG. 2 shows a flow chart 200 illustrating the process for analyzing revenue causality in accordance with the Revenue Causality Analyzer 100 illustrated in FIG. 1. At step 210, the time periods to be compared are selected. In some embodiments, a reference time period and a comparison time period is selected. In some embodiments, these time periods may include consecutive financial quarters. In alternate embodiments, the time periods may include similar times brackets on a recurring annual basis. Moreover, it may be advantageous, in some embodiments, to choose time periods prior and post management or production changes. In sum, any time periods may be selected for comparison depending on the requirements of the business. Additionally, in some embodiments, multiple time periods may be compared against another in order to show progressive trends. In these analyses, the process described in flow chart 200 is repeated for each set of time periods to be compared, and upon output, at step 250, all results may be compiled for use by the user.

In step 220, Transaction Data 105 for each time period selected in step 210 may be input for further processing. Input may be preformed manually, with the user entering transaction data. Alternatively, in some embodiments, Transaction Data 105 may be electronically compiled through point-of-sales data from a cash register, invoice compilation, or electronic bookkeeping software. Transaction Data 105 includes, but is not limited to, products, the price of each product, volume of each product sold, cost data and exchange rate data. Cost data may include costs per product, or cost estimations. In some embodiments, product, price and volume is the only data required in order to perform a comprehensive revenue causality analysis of price effect, volume effect and mix effect. These data are routinely recorded by most businesses, and thus the present invention enables extensive, accurate revenue causality analysis with minimal data collection effort from the business.

In step 230, the inputted Transaction Data 105 is prepared for analysis. Preparation may include entering missing data values and correcting data errors. Such errors may exist due to changes in the product line, data input errors, software glitches or human errors.

In step 240, the prepared data is run through causality equations, which determine the amount of revenue attributable to each causality effect.

In step 250, the results of the causality equations are outputted for user consumption. Results may then be used in downstream applications and for raw consumption for price management purposes. The output may be in terms of a dollar amount, wherein the summation of all the causal effects is equal the change in revenue between the reference time period and the comparison time period. Additionally, the output may be a function of marginal changes.

Then, in step 260, the user may choose to interact with the outputted results in order to make alterations to transaction data, hone in on specific results or otherwise segregate the outputted results in order to increase their functionality. If the user decides to interact with the outputted data then the process returns to step 240, where the causality equations are run again. The outputted results may then be updated, in step 250, to incorporate the interactions. Next, the user again is given the option to interact with the outputted results, in step 260. Otherwise, if the user does not choose to interact with the results the process ends.

Individual steps of the revenue causality analysis 200 will be discussed separately in more detail below.

II. Data Preparation

Figure 3:
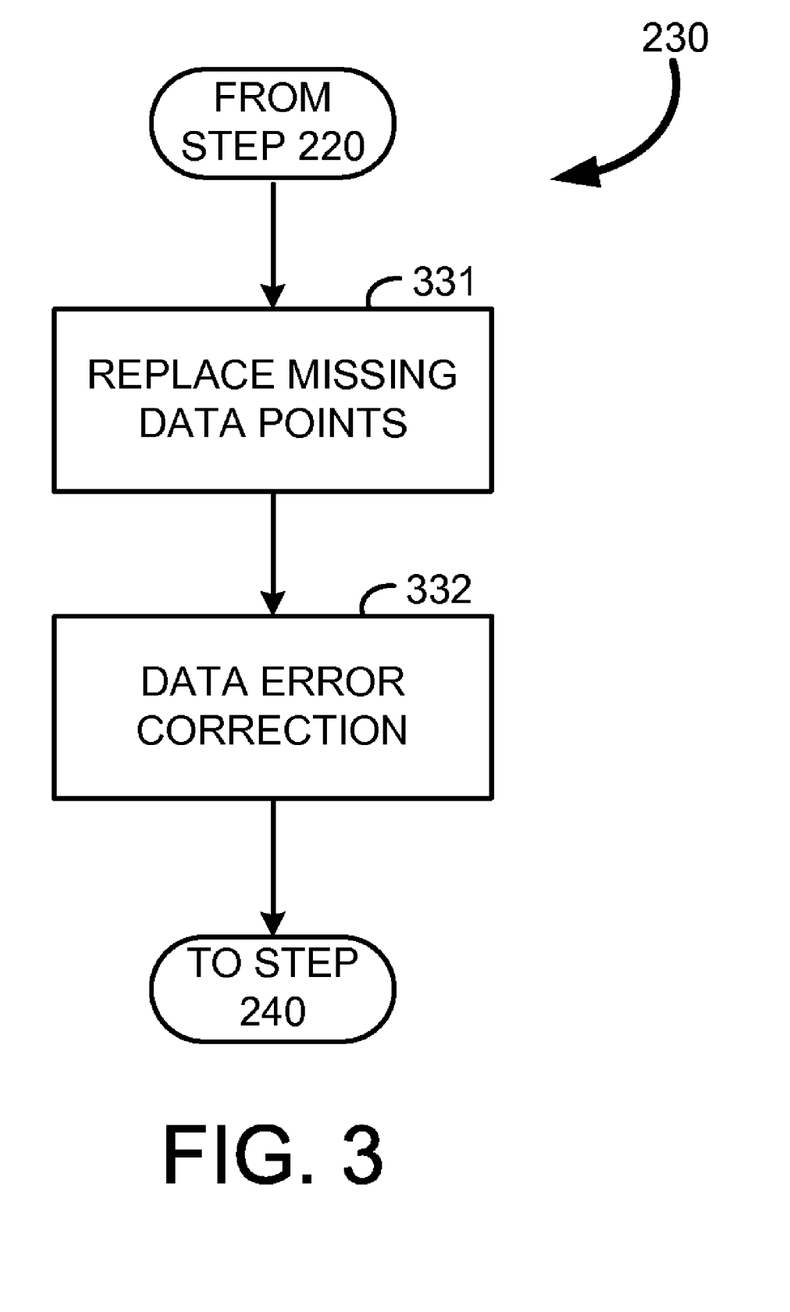
FIG. 3 shows a flow chart illustrating the process for a data preparation for the revenue causality analyzer of FIG. 1.

FIG. 3 shows a flow chart expounding the Preparation of Data 230. In this process missing data points are replaced, in step 331. Then, in step 332, errors in the data are corrected for.

Figure 4A:
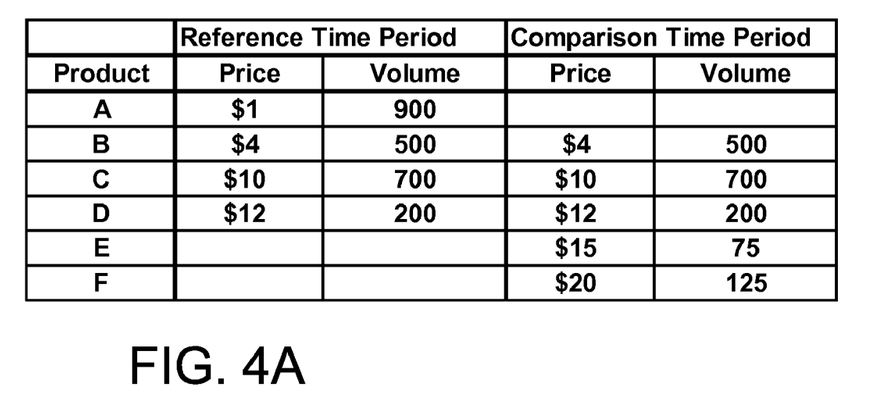
FIG. 4A shows an illustration of a raw exemplary data chart for the revenue causality analyzer of FIG. 1.
Figure 4B:
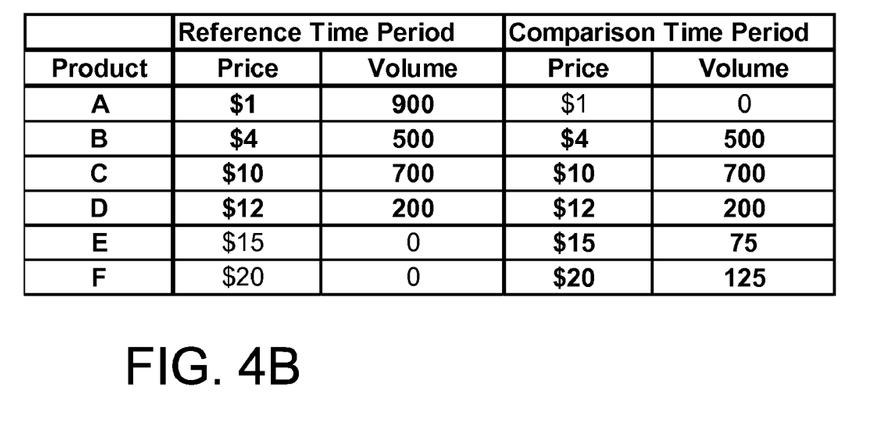
FIG. 4B shows an illustration of a prepared exemplary data chart for the revenue causality analyzer of FIG. 1.

Even in immaculately maintained business records, data will be missing when a product is introduced or discontinued during or between the reference and comparison time periods. An example of such a situation is shown in the exemplary data chart illustrated in FIG. 4A. In this table, six products are shown, A-F, in the leftmost column. Price and product sales volume are shown in the remaining columns for both the reference and comparison time periods. Time periods are labeled at the top row. Price and volume columns are referenced by the labels in the second row. Here the price information is shown in dollars; however, any denominator may be used. Likewise, in the example, volume is given in units; however, any measure of quantity may be used, such as lots or batches. In this exemplary data set, product A is seen to be discontinued in the comparison time period, as seen by missing data points. Similarly, products E and F are introduced in the comparison time period, but do not exist during the reference time period. In FIG. 4B, the exemplary data table of FIG. 4A is again shown, however in this data table the missing data points have been replaced with functional data points. These replacements are seen as lighter numerals for the comparison data for product A, and reference data for products E and F.

Figure 5:
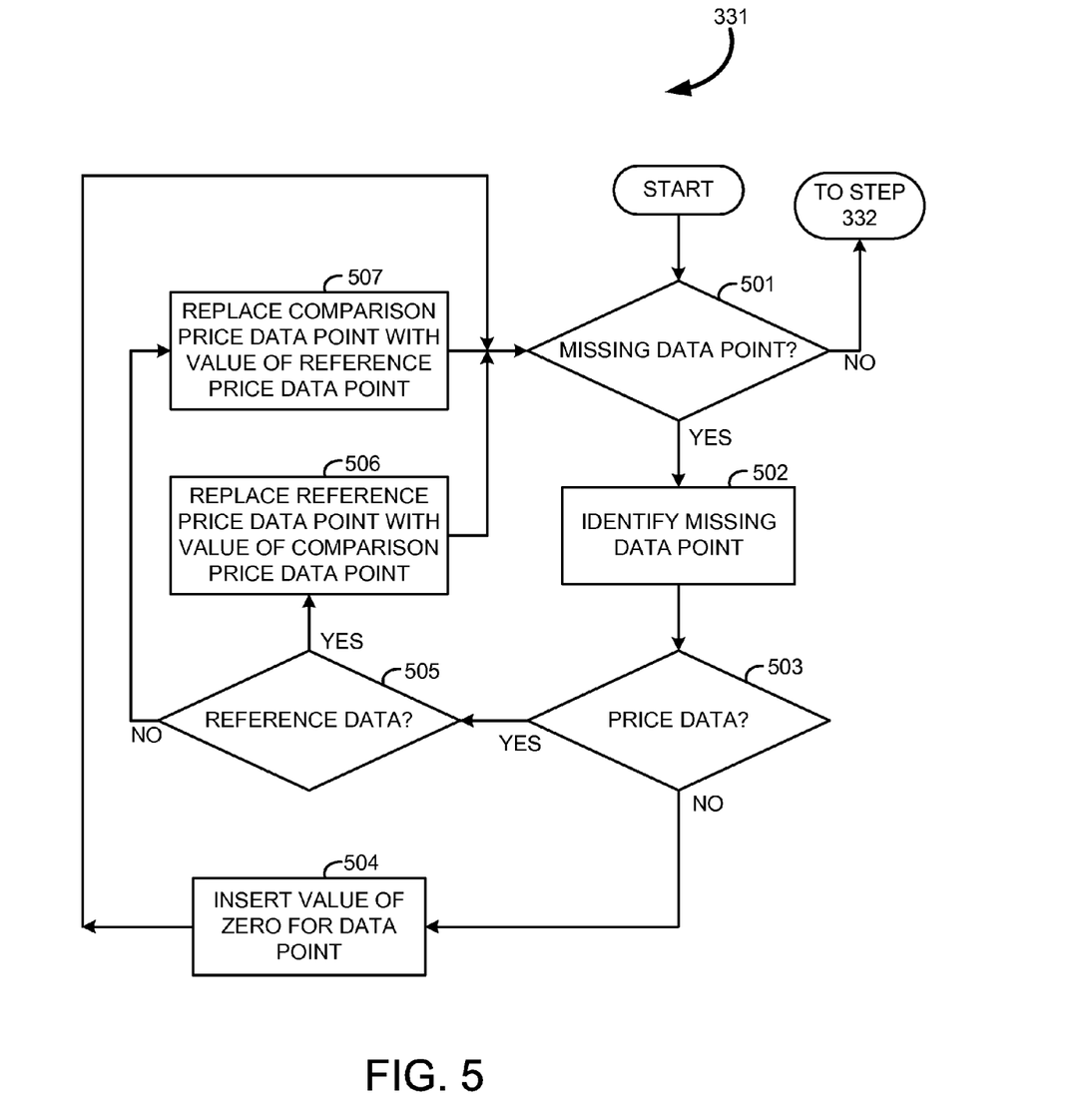
FIG. 5 shows a flow chart illustrating the process for replacement of missing data for the revenue causality analyzer of FIG. 1.

FIG. 5 shows a flow chart 331 illustrating the process of replacing missing data points. In step 502, a search is done of the data set to determine if any data points are missing. If no data points are missing the process ends, otherwise the data point is identified in step 502. Then, in step 503, an inquiry is made as to if the missing data point identified is price data. If the data point is not price data, then the missing data point is replaced with a zero value, in step 504. This replacement occurs whenever product sales volume data is missing. After the data is replaced the process returns to step 502, to determine if there are any remaining missing data points.

Otherwise, if the missing data point is pricing data, in step 503, an inquiry is made as to if the missing data point is from the reference data set, in step 505. If the missing data point is a reference data point, then the missing data point is replaced with the pricing data for the same product from the comparison time period data set, in step 506. After the data is replaced the process returns to step 502, to determine if there are any remaining missing data points.

Else, if the missing data point is not a reference data point (comparison data point), then the missing data point is replaced with the pricing data for the same product from the reference time period data, in step 507. After the data is replaced the process returns to step 502, to determine if there are any remaining missing data points.

As previously noted, in some embodiments, data preparation may include Correction of Data Errors 332. Obvious data discrepancies, such as negative price data, may be corrected in this step. In some embodiments, data values greater than an expected values by a predetermined value may also be corrected. For example, in some embodiments, if sales volume data is greater than two standard deviations from the expected sales volume, the data point may be corrected to reflect the expected value instead of the erroneous value.

Moreover, in some embodiments, where Transaction Data 105 includes redundant data, conflicting data may be corrected. For example, if Transaction Data 105 includes price, volume and aggregate revenue data, a comparison may be made between the transaction revenue data and the calculated revenue found by multiplying together price and volume data. If a discrepancy exists, the data may be combed in order to identify and correct the erroneous transaction data.

After Transaction Data 105 has been Prepared 230 it may be analyzed by the causality equations to determine to what extent each causal effect contributes to the change in revenue.

III. Causality Equation

Causality equation includes component equations known as effects. Said effects include a price effect, a volume effect, a mix effect, an exchange effect and a cost effect. Additional effects exist, and may be included within the causality equation as needs dictate. For most business applications, however, the above list of effects is sufficient for rapid and accurate Revenue Causality Analysis 200. The said effects may be summed to provide for the change in revenue.

The following notation is helpful in the understanding of the following equations:

Subscript—i: Product, where products are items with common UPC numbers, model numbers or SKU numbers.

Subscript—k: Currency

N: total number of products.

M: total number of currencies.

$p_{i1k}$: the price of product i in the reference time period (time period 1), in currency k.

$p_{i2k}$: the price of product i in the comparison time period (time period 2), in currency k.

$v_{i1k}$: the volume of product i sold in the reference time period (time period 1), in currency k.

$v_{i2k}$: the volume of product i sold in the comparison time period (time period 2), in currency k.

$e_{1k}$: the exchange rate in the reference time period (time period 1), in currency k. Assume the $e_{1k}$ for the base currency is always 1.

$e_{2k}$: the exchange rate in the reference time period (time period 2), in currency k. Assume the $e_{2k}$ for the base currency is always 1.

A. Change in Revenue

The change in Revenue may be given as part of the transaction data, or may be calculated from the price and volume data.

The change in revenue is given by:

$$\sum_{k=1}^{M}\sum_{i=1}^{N}\left(\frac{p_{i2k}v_{i2k}}{e_{2k}}\right)-\sum_{k=1}^{M}\sum_{i=1}^{N}\left(\frac{p_{i1k}v_{i1k}}{e_{1k}}\right) \quad \text{Equation 1}$$

To calculate the change in revenue, the price of each product in the comparison time period at a certain currency ($p_{i2k}$) is multiplied by the volume of the product sold in the comparison period in that currency ($v_{i2k}$), thus providing the revenue for each product in the comparison time period in that currency. All product revenues for the comparison time period in that currency are divided by the exchange rate at the comparison time period for that currency ($e_{2k}$), to produce relative product revenues for the comparison time period. The relative product revenues for the comparison time period are summed for each product, thus providing the total revenue for the comparison time period for a currency. The total revenue for the comparison time period for each currency is then summed across each currency to produce the total revenue for the comparison time period.

Then, the price of each product in the reference time period at a certain currency ($p_{i1k}$) is multiplied by the volume of the product in the reference period in that currency ($v_{i1k}$), thus providing the revenue for each product in the reference time period in that currency. All product revenues for the reference time period in that currency are divided by the exchange rate at the reference time period for that currency ($e_{1k}$), to produce relative product revenues for the reference time period. The relative product revenues for the reference time period are summed for each product, thus providing the total revenue for the reference time period for a currency. The total revenue for the reference time period for each currency is then summed across each currency to produce the total revenue for the reference time period.

The total revenue for the reference time period is subtracted from the total revenue for the comparison time period, thereby providing the change in revenue.

B. Price Effect

The price effect calculates the quantity of revenue change that is attributable to changes in pricing.

The price effect is given by:

$$\sum_{k=1}^{M}\sum_{i=1}^{N}\left(\left(\frac{p_{i2k}-p_{i1k}}{e_{1k}}\right)\cdot v_{i2k}\right) \quad \text{Equation 2}$$

To calculate the price effect, the price of each product at the reference time period in a certain currency ($p_{i1k}$) is subtracted from the price of the same product at the comparison time period in the currency ($p_{i2k}$), thus providing the change in price for each product at the currency. The change in price for each product at the currency is divided by the exchange rate for the currency at the reference time period ($e_{1k}$), to produce the relative change in price for each product at that currency.

The relative change in price for each product at that currency is multiplied by the volume of the same product sold during the comparison time period at that currency ($v_{i2k}$). This provides the price effect per product at that currency.

The price effects for each product at that currency are summed across all products to provide the price effect at that currency. The price effect at that currency is summed across all currencies to produce the price effect.

C. Volume Effect

The volume effect calculates the quantity of revenue change that is attributable to changes in volumes sold.

The volume effect is given by:

$$\left(\sum_{k=1}^{M}\sum_{i=1}^{N} v_{i2k} - \sum_{k=1}^{M}\sum_{i=1}^{N} v_{i1k}\right) \cdot \frac{\sum_{k=1}^{M}\sum_{i=1}^{N}\left(\frac{p_{i1k}}{e_{1k}} v_{i1k}\right)}{\sum_{k=1}^{M}\sum_{i=1}^{N} v_{i1k}} \quad \text{Equation 3}$$

To calculate the volume effect, the volumes of all products sold for the reference time period in a currency ($v_{i1k}$), are summed across the products, resulting in the total volume for the reference time period in a currency. Then, total volume for the reference time period in a currency is summed across all currencies to produce the total volume for the reference time period.

Likewise, the volumes of all products sold for the comparison time period in a currency ($v_{i2k}$), are summed across the products, resulting in the total volume for the comparison time period in a currency. Then, total volume for the comparison time period in a currency is summed across all currencies to produce the total volume for the comparison time period. The total volume for the comparison time period is subtracted by the total volume for the reference time period to determine the change in volume.

The total revenue for the reference time period is calculated. The price of each product in the reference time period at a certain currency ($p_{i1k}$) is multiplied by the volume of the product in the reference period in that currency ($v_{i1k}$), providing the revenue for each product in the reference time period in that currency. All product revenues for the reference time period in that currency are divided by the exchange rate at the reference time period for that currency ($e_{1k}$), to produce relative product revenues for the reference time period at that currency. The relative product revenues for the reference time period at that currency are summed for each product, thus providing the total revenue for the reference time period for that currency. The total revenue for the reference time period for each currency is then summed across each currency to produce the total revenue for the reference time period.

The total revenue for the reference time period is then divided by the total volume sales for the reference time period. Total revenue divided by total volume produces a value of the revenue per product sold in the reference time period. As stated above, the total volume sales of the reference time period is found by summing the volumes of all products sold for the reference time period in a currency ($v_{i1k}$), across the products, resulting in the total volume for the reference time period in a currency. Then, total volume for the reference time period in a currency is summed across all currencies to produce the total volume for the reference time period.

Lastly, the revenue per product sold in the reference time period is multiplied by the change in volume to compute the volume effect.

D. Mix Effect

The mix effect calculates the quantity of revenue change that is attributable to changes in the mix of products sold.

The mix effect is given by:

$$\sum_{k=1}^{M}\sum_{i=1}^{N} v_{i2k} \cdot \sum_{k=1}^{M}\sum_{i=1}^{N}\left(\frac{p_{i1k}}{e_{1k}}\left(\frac{v_{i2k}}{\sum_{k=1}^{M}\sum_{i=1}^{N} v_{i2k}} - \frac{v_{i1k}}{\sum_{k=1}^{M}\sum_{i=1}^{N} v_{i1k}}\right)\right) \quad \text{Equation 4}$$

To calculate the mix effect, the volumes of all products sold for the comparison time period in a currency ($v_{i2k}$), are summed across the products, resulting in the total volume for the comparison time period in a currency. Then, total volume for the comparison time period in a currency is summed across all currencies to produce the total volume for the comparison time period.

Similarly, the volumes of all products sold for the reference time period in a currency ($v_{i1k}$), are summed across the products, resulting in the total volume for the reference time period in a currency. Then, total volume for the reference time period in a currency is summed across all currencies to produce the total volume for the reference time period.

Additionally, the volume of each product sold in the reference time period in a currency ($v_{i1k}$) is divided by the total volume for the reference time period, thus calculating the percent of sales volume for the product in the reference time period in the currency.

The volume of each product sold in the comparison time period in a currency ($v_{i2k}$) is divided by the total volume for the comparison time period, thus calculating the percent of sales volume for the product in the comparison time period in the currency.

The percent of sales volume for the product in the reference time period in the currency is then subtracted from the percent of sales volume for the product in the comparison time period in the currency, to give the change in percent of sales volume for the product in the currency.

The price of the product for the reference time period in the currency ($p_{i1k}$) is divided by the exchange rate at the reference time period for that currency ($e_{1k}$), to produce relative price of the product for the reference time in the currency.

The relative price of the product for the reference time in the currency is then multiplied by the change in percent of sales volume for the product in the currency, thus calculating the percent revenue change of the product in the currency. The percent revenue change of the product in the currency is summed across all products, thus producing a total percent revenue change in the currency. The total percent revenue change in the currency is summed across all currencies, thus producing a total percent revenue change.

The total percent revenue change is multiplied by the total volume for the comparison period, thus giving the mix effect.

E. Exchange Effect

The exchange effect calculates the quantity of revenue change that is attributable to exchange rates.

The exchange effect is given by:

$$\sum_{k=1}^{M}\sum_{i=1}^{N}\left(\left(\frac{p_{i2k}}{e_{2k}} - \frac{p_{i2k}}{e_{1k}}\right) \cdot v_{i2k}\right) \qquad \text{Equation 5}$$

To calculate exchange effect, the price of the product for the comparison time period in the currency ($p_{i2k}$) is divided by the exchange rate at the comparison time period for that currency ($e_{2k}$), to produce the relative price of the product for the comparison time in the currency.

The price of the product for the comparison time period in the currency ($p_{i2k}$) is divided by the exchange rate at the reference time period for that currency ($e_{1k}$), to produce the price of the product for the comparison time in the currency at the reference rate.

By subtracting the price of the product for the comparison time in the currency at the reference rate from the relative price of the product for the comparison time in the currency, a change in price for the product at the comparison time in a currency due to exchange rate difference is calculated.

The change in price for the product at the comparison time due to exchange rate difference is multiplied by the volume of sales of a product at the comparison time period at the currency ($v_{i2k}$) to calculate the change in revenue for the product at the comparison time in a currency due to exchange rate difference.

The change in revenue for the product at the comparison time in a currency due to exchange rate difference is summed across all products to calculate change in revenue at the comparison time in a currency due to exchange rate difference. The change in revenue at the comparison time in a currency due to exchange rate difference is summed across all currencies to calculate the exchange effect.

F. Combined Causality Equation

By combining the foregoing equations a causality equation may be derive. The causality equation includes the sum of the effects, equal to the change in revenue. The causality equation is shown below:

$$\overbrace{\sum_{k=1}^{M}\sum_{i=1}^{N}\left(\frac{p_{i2}v_{i2}}{e_{2k}}\right) - \sum_{k=1}^{M}\sum_{i=1}^{N}\left(\frac{p_{i1}v_{i1}}{e_{1k}}\right)}^{\text{Change in Revenue}} = \qquad \text{Equation 6}$$

$$\overbrace{\sum_{k=1}^{M}\sum_{i=1}^{N}\left(\left(\frac{p_{i2k} - p_{i1k}}{e_{1k}}\right) \cdot v_{i2k}\right)}^{\text{Price effect}} + \overbrace{\sum_{k=1}^{M}\sum_{i=1}^{N}\left(\left(\frac{p_{i2k}}{e_{2k}} - \frac{p_{i2k}}{e_{1k}}\right) \cdot v_{i2k}\right)}^{\text{Exchange effect}}$$

$$\underbrace{\left(\sum_{k=1}^{M}\sum_{i=1}^{N}v_{i2k} - \sum_{k=1}^{M}\sum_{i=1}^{N}v_{i1k}\right) \cdot \frac{\sum_{k=1}^{M}\sum_{i=1}^{N}\left(\frac{p_{i1k}}{e_{1k}}v_{i1k}\right)}{\sum_{k=1}^{M}\sum_{i=1}^{N}v_{i1k}}}_{\text{Volume effect}} +$$

$$\underbrace{\sum_{k=1}^{M}\sum_{i=1}^{N}v_{i2k} \cdot \sum_{k=1}^{M}\sum_{i=1}^{N}\left(\frac{p_{i1k}}{e_{1k}}\left(\frac{v_{i2k}}{\sum_{k=1}^{M}\sum_{i=1}^{N}v_{i2k}} - \frac{v_{i1k}}{\sum_{k=1}^{M}\sum_{i=1}^{N}v_{i1k}}\right)\right)}_{\text{Mix effect}}$$

In some embodiments, alternate effects may be included within the causality equation. For example, cost effects, dividend gains, stock sales, inventory appreciation/depreciation, and theft/loss may be included as additional causal effects. It should be noted, as is well known to those skilled in the art, that with the inclusion of a cost effect the analysis becomes a marginal change causality analysis.

These alternate effects may in turn require additional transaction data. For example, in embodiments including cost effects, Transaction Data 105 may include cost data associated with each product. Alternatively, in some embodiments, the cost data may be estimated using industry standards. Moreover, in some embodiments, both real data may be included when available, and missing cost data may be estimated in the data preparation step 230. As such, the causality equation is intended to be flexible enough to meet business needs, without placing any burden upon the business data collection practices.

Another example of the flexibility of the causality equation includes a business which utilizes one currency, thus eliminating the need for exchange effects. By assuming that the exchange rate for the base currency is one ($e_{1k}=e_{2k}=1$) as stated above, the causality equation may be seen as reducing to a simpler form, as shown below:

$$\overbrace{\sum_{i=1}^{N}((p_{i2} - p_{i1}) \cdot v_{i2})}^{\text{Price effect}} + \overbrace{\left(\sum_{i=1}^{N}v_{i2} - \sum_{i=1}^{N}v_{i1}\right) \cdot \frac{\sum_{i=1}^{N}(p_{i1}v_{i1})}{\sum_{i=1}^{N}v_{i1}}}^{\text{Volume effect}} + \qquad \text{Equation 7}$$

$$\underbrace{\sum_{i=1}^{N}v_{i2} \cdot \sum_{i=1}^{N}\left(p_{i1}\left(\frac{v_{i2}}{\sum_{i=1}^{N}v_{i2}} - \frac{v_{i1}}{\sum_{i=1}^{N}v_{i1}}\right)\right)}_{\text{Mix effect}} =$$

$$\underbrace{\sum_{i=1}^{N}(p_{i2}v_{i2}) - \sum_{i=1}^{N}(p_{i1}v_{i1})}_{\text{Change in Revenue}}$$

IV. Output

Figure 6:
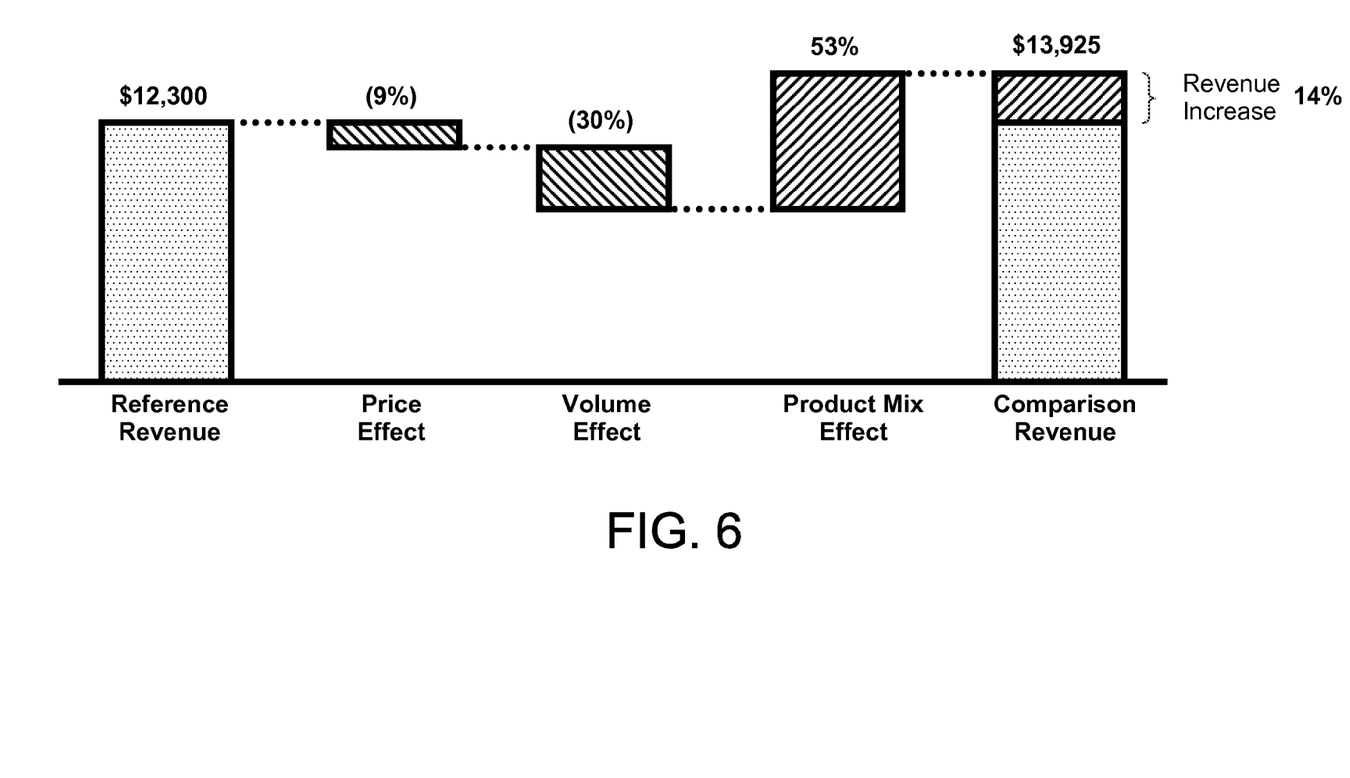
FIG. 6 shows a causality waterfall diagram for the revenue causality analyzer of FIG. 1.

An example of the output for the Causality Equation Application 240 may be seen as what is referred to as a causality waterfall. FIG. 6 shows an example of a causality waterfall diagram derived from the analysis of revenue of causality for the exemplary data charts shown in FIGS. 4A and 4B. The causality waterfall diagram illustrates the increase in revenue from the reference time period to the comparison time period as being an increase of roughly 14%. The price effect, volume effect and mix effect are also shown. Price effect and volume effects are negative in this example; however, the mix effect is positive enough to offset the price and volume effects, and is accountable for a positive revenue change. In this example only one currency is considered, therefore the exchange effect is inconsequential.

Figure 7:
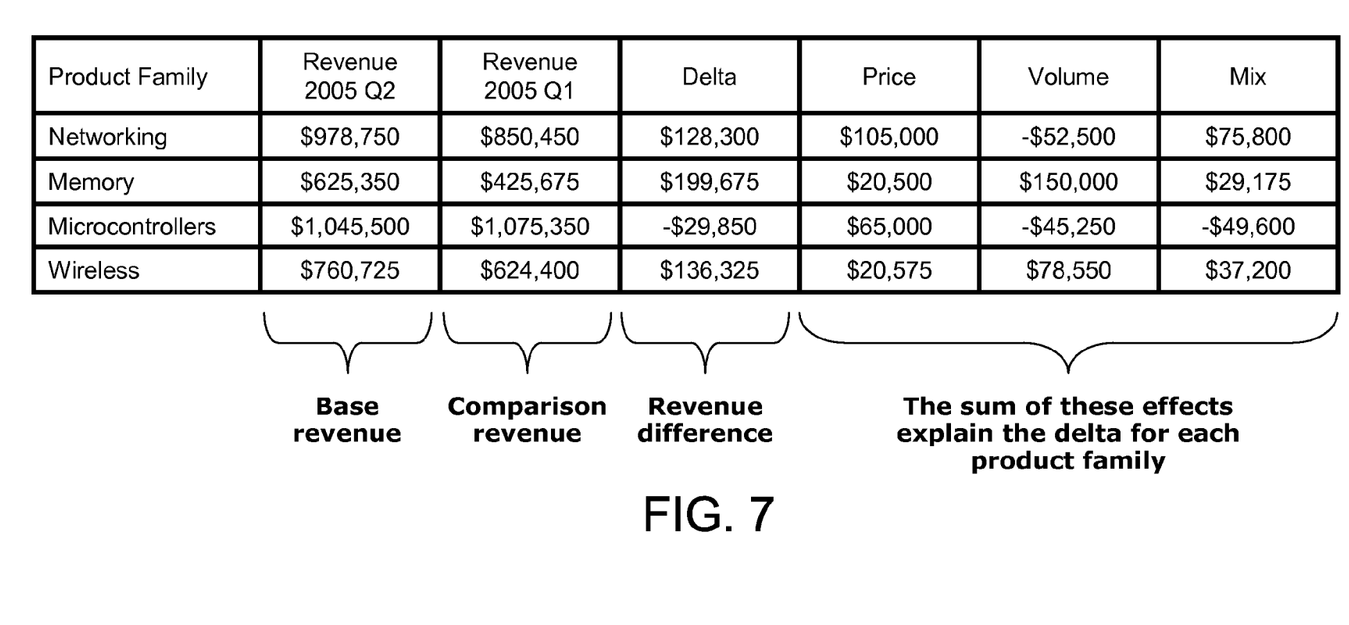
FIG. 7 shows an illustration of an exemplary output for the revenue causality analyzer of FIG. 1.

FIG. 7 shows an illustration of an exemplary output for the Revenue Causality Analyzer 100 when realistic Transaction Data 105 is utilized for product families. In this example the revenue for the reference time period and the comparison time period is shown, along with the change in revenue for each product family. The relevant price effect, volume effect and mix effect for each product family is also shown. In some embodiments, the user may be able to expand the product family categories. Product families may include individual products, product sub-groupings, or a combination. For example, within the product family labeled 'Wireless' there may exist a subgroup for wireless hardware and another subgroup for wireless management software. Each subgroup may include yet smaller subgroups, individual products, or a combination of both.

In some embodiments, the user may Interact 260 with the output by honing into individual subgroups. The Transaction Data 105 from the subgroups may then be analyzed by Applying the Causality Equation 240 to determine the causality effects of the individual subgroup. In this way, the user may develop a greater understanding of the causal effects on revenue for every level of the business. As such, a refined and detailed business plan may be implemented in order to most effectuate a business goal.

Figure 8:
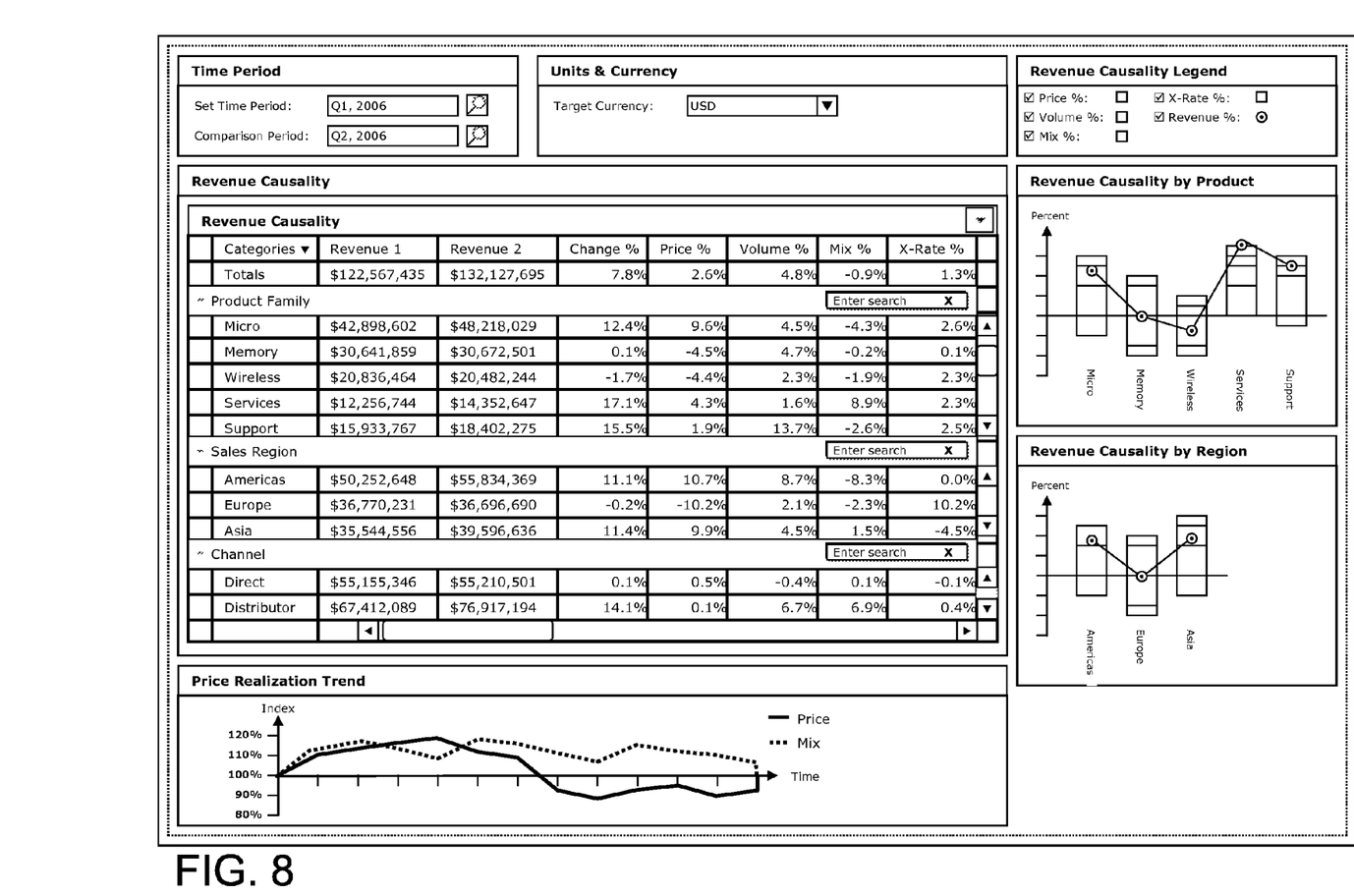
FIG. 8 shows an illustration of a user interface for the revenue causality analyzer of FIG. 1.

FIG. 8 shows an illustration of a user interface for the analysis of revenue causality. This interface illustrates the ability for the causality analyzer to be incorporated into a system for advanced effect analysis, including the tracking of effect trends and ease of user interaction across product families, sales regions and sales channel.

V. System

Figure 9A:
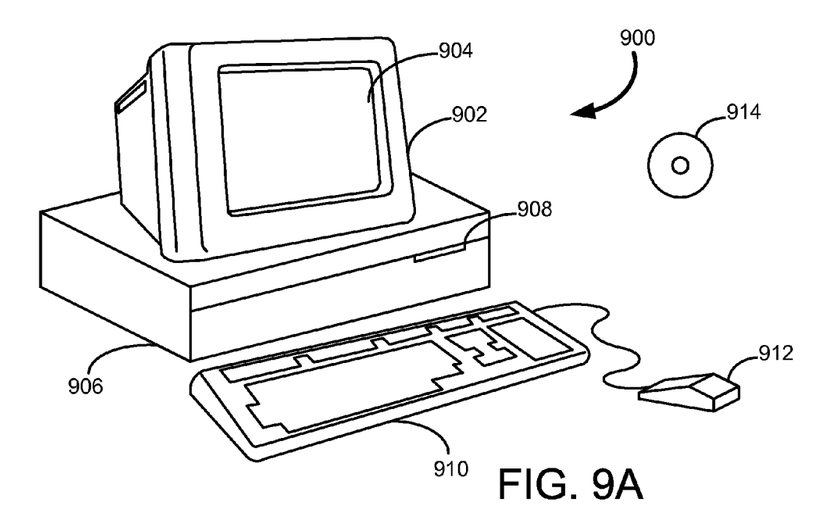
FIG. 9A illustrates a computer system, which forms part of a network and is suitable for implementing the revenue causality analyzer of FIG. 1.
Figure 9B:
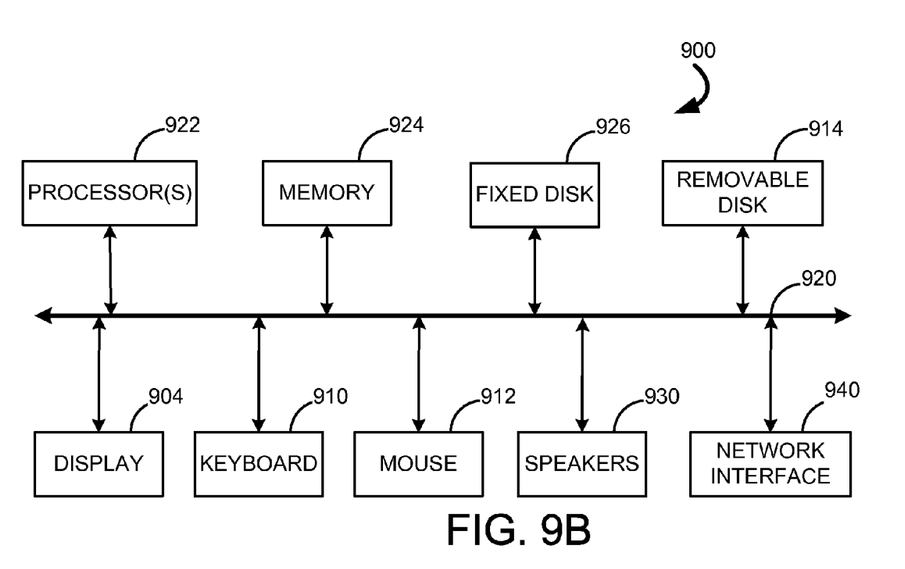
FIG. 9B illustrates a block diagram of a computer system and network suitable for implementing the revenue causality analyzer of FIG. 1.

FIGS. 9A and 9B illustrate a Computer System 900, which is suitable for implementing embodiments of the present invention. FIG. 9A shows one possible physical form of the Computer System 900. Of course, the Computer System 900 may have many physical forms ranging from a printed circuit board, an integrated circuit, and a small handheld device up to a huge super computer. Computer system 900 may include a Monitor 902, a Display 904, a Housing 906, a Disk Drive 908, a Keyboard 910, and a Mouse 912. Disk 914 is a computer-readable medium used to transfer data to and from Computer System 900.

FIG. 9B is an example of a block diagram for Computer System 900. Attached to System Bus 920 are a wide variety of subsystems. Processor(s) 922 (also referred to as central processing units, or CPUs) are coupled to storage devices, including Memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Disk 926 may also be coupled bi-directionally to the Processor 922; it provides additional data storage capacity and may also include any of the computer-readable media described below. Fixed Disk 926 may be used to store programs, data, and the like and is typically a secondary storage medium (such as a hard disk) that is slower than primary storage. It will be appreciated that the information retained within Fixed Disk 926 may, in appropriate cases, be incorporated in standard fashion as virtual memory in Memory 924. Removable Disk 914 may take the form of any of the computer-readable media described below.

Processor 922 is also coupled to a variety of input/output devices, such as Display 904, Keyboard 910, Mouse 912 and Speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. Processor 922 optionally may be coupled to another computer or telecommunications network using Network Interface 940. With such a Network Interface 940, it is contemplated that the Processor 922 might receive information from the network, or might output information to the network in the course of performing the above-described Revenue Causality Analyzer 100. Furthermore, method embodiments of the present invention may execute solely upon Processor 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the present invention has been described in considerable detail with reference to exemplary embodiments, modifications and variations may be made to the disclosed embodiments while remaining within the subject and spirit of the invention. Therefore, the spirit and scope of the appended claims should not be limited to the description of the versions contained herein.

What is claimed is:

1. A revenue causality analyzer, useful in association with price management systems, the revenue causality analyzer comprising:
   a time period selector configured to select a reference time period and a comparison time period;
   a data preparer configured to prepare transaction data including pricing data and volume data about products;
   a causality attributor configured to attribute at least one causality effect by analyzing the transaction data utilizing a causality equation; and
   wherein the causality equation is:

$$\sum_{k=1}^{M}\sum_{i=1}^{N}\left(\frac{p_{i2}v_{i2}}{e_{2k}}\right)-\sum_{k=1}^{M}\sum_{i=1}^{N}\left(\frac{p_{i1}v_{i1}}{e_{1k}}\right)=$$

$$\sum_{k=1}^{M}\sum_{i=1}^{N}\left(\left(\frac{p_{i2k}-p_{i1k}}{e_{1k}}\right)\cdot v_{i2k}\right)+\sum_{k=1}^{M}\sum_{i=1}^{N}\left(\left(\frac{p_{i2k}}{e_{2k}}-\frac{p_{i2k}}{e_{1k}}\right)\cdot v_{i2k}\right)$$

$$\left(\sum_{k=1}^{M}\sum_{i=1}^{N}v_{i2k}-\sum_{k=1}^{M}\sum_{i=1}^{N}v_{i1k}\right)\cdot\frac{\sum_{k=1}^{M}\sum_{i=1}^{N}\left(\frac{p_{i1k}}{e_{1k}}v_{i1k}\right)}{\sum_{k=1}^{M}\sum_{i=1}^{N}v_{i1k}}+$$

$$\sum_{k=1}^{M}\sum_{i=1}^{N}v_{i2k}\cdot\sum_{k=1}^{M}\sum_{i=1}^{N}\left(\frac{p_{i1k}}{e_{1k}}\left(\frac{v_{i2k}}{\sum_{k=1}^{M}\sum_{i=1}^{N}v_{i2k}}-\frac{v_{i1k}}{\sum_{k=1}^{M}\sum_{i=1}^{N}v_{i1k}}\right)\right)$$

2. The revenue causality analyzer as recited in claim 1, wherein the transaction data includes reference revenue and comparison revenue, wherein reference revenue is revenue at the reference time period and comparison revenue is revenue at the comparison time period, and wherein by subtracting the reference revenue from the comparison revenue a change in revenue is calculated.

3. The revenue causality analyzer as recited in claim 2, wherein the at least one attributed causality effect includes at least one of a price effect, a volume effect, a mix effect an exchange effect, a cost effect, a dividend effect, a loss effect, and an inventory appreciation effect.

4. The revenue causality analyzer as recited in claim 3, wherein the causality equation is defined by the change in revenue equal to a summation of the at least one attributed causality effect.

5. The revenue causality analyzer as recited in claim 1, wherein the data preparer includes at least one of a missing data exchanger and data error corrector.

6. The revenue causality analyzer as recited in claim 5, wherein the missing data exchanger is configured to identify missing data and to determine if the missing data is price data or volume data; and
- if the missing data is volume data, then replacing the missing volume data with a value of zero;
- else, if the missing data is price data, then determining if the missing price data is from the reference time period or the comparison time period; and
  - if the missing price data is from the reference time period, then replacing the missing price data with price data from the comparison time period; and
  - else, if the missing price data is from the comparison time period, then replacing the missing price data with price data from the reference time period.

7. The revenue causality analyzer as recited in claim 3, wherein the transaction data includes at least one of an exchange rate at the reference time period, an exchange rate at the comparison time period, prices of the products at the reference time period in the currencies, prices of the products at the comparison time period in the currencies, volume of the products sold in the reference time period, volume of the products sold in the comparison time period, volume of each of the products sold in the reference time period in a currency, and volume of each of the products sold in the comparison time period in a currency.

8. The revenue causality analyzer as recited in claim 7, wherein the price effect comprises:
- subtracting the prices of products at the reference time period in the currencies from the prices of the products at the comparison time period in the currencies to calculate a change in price for the products at the currencies;
- dividing the change in price for the products at the currencies by the exchange rate at the reference time period to calculate a relative change in price for the products at the currencies;
- multiplying the relative change in price for the products at the currencies by the volume of the products sold in the comparison time period to calculate revenues for the products at the currencies;
- summing the revenues for the products at the currencies across the products to calculate revenues at the currencies; and
- summing the revenues at the currencies across the currencies.

9. The revenue causality analyzer as recited in claim 7, wherein the volume effect comprises:
- multiplying the prices of the products at the reference time period in the currencies by the volume of the products sold in the reference time period to calculate revenue of the products for the reference time period in the currencies;
- dividing the revenue of the products for the reference time period in the currencies by the exchange rate at the reference time period to calculate relative revenue of the products for the reference time period in the currencies;
- summing the relative revenue of the products for the reference time period in the currencies across the products to calculate relative revenue for the reference time period in the currencies;
- summing the relative revenue for the reference time period in the currencies across the currencies to calculate relative revenue for the reference time period;
- dividing the relative revenue for the reference time period by the volume of the products sold in the reference time period to calculate revenue per product sold in the reference time period;
- subtracting the volume of the products sold in the reference time period by the volume of the products sold in the comparison time period to calculate change in volume; and
- multiplying the change in volume by revenue per product sold in the reference time period.

10. The revenue causality analyzer as recited in claim 7, wherein the mix effect comprises:
- dividing the volume of each product sold in the reference time period in a currency by the volume of the products sold in the reference time period to calculate a percent of sales volume for the products in the reference time period;
- dividing the volume of each product sold in the comparison time period in a currency by the volume of the products sold in the comparison time period to calculate a percent of sales volume for the products in the comparison time period;
- subtracting the percent of sales volume for the products in the reference time period from the percent of sales volume for the products in the comparison time period to calculate a change in percent of sales volume for the products;
- dividing the price of the products in the reference time period in the currencies by the exchange rate at the reference time period to calculate a relative price of the products for the reference time in the currencies;
- multiplying the relative price of the products for the reference time in the currencies by the change in percent of sales volume for the products to calculate a percent revenue change of the products in the currencies;
- summing the percent revenue change of the products in the currencies across the products to calculate a percent revenue change in the currencies;
- summing the percent revenue change in the currencies across the currencies to calculate a percent revenue change; and
- multiplying the percent revenue change by the volume of products sold in the comparison time period.

11. The revenue causality analyzer as recited in claim 7, wherein the exchange effect comprises:
- dividing the price of the products in the comparison time period in the currencies by the exchange rate at the comparison time period to calculate relative prices of the products at the comparison time periods in the currency;
- dividing the price of the products in the comparison time period in the currencies by the exchange rate at the reference time period to calculate prices of the products in the comparison time in the currencies at the exchange rate in the reference time period;

subtracting the price of the product in the comparison time in the currencies at the exchange rate in the reference time period from the relative prices of the products at the comparison time in the currencies to calculate changes in price for the products at the comparison time in the currencies due to exchange rate difference;

multiplying the changes in price for the products at the comparison time in the currencies due to exchange rate difference by the volume of sales of the products at the comparison time period to calculate changes in revenue for the products at the comparison time in the currencies due to exchange rate difference;

summing changes in revenue for the products at the comparison time in the currencies due to exchange rate difference across the products to calculate changes in revenue at the comparison time in the currencies due to exchange rate difference; and summing changes in revenue at the comparison time in the currencies due to exchange rate difference across the currencies.

12. A computer implemented method for analyzing revenue causality, useful in association with price management systems, the method comprising:

selecting, by a processor, time periods, wherein the selection of the time periods includes selecting a reference time period and a comparison time period;

receiving, by a processor, transaction data, wherein transaction data includes pricing data and volume data about products;

preparing, by a processor, the transaction data;

attributing, by a processor, at least one causality effect by analyzing the transaction data utilizing a causality equation;

outputting, by a processor, the at least one causality effect, and wherein the causality equation is:

$$\sum_{k=1}^{M}\sum_{i=1}^{N}\left(\frac{p_{i2}v_{i2}}{e_{2k}}\right) - \sum_{k=1}^{M}\sum_{i=1}^{N}\left(\frac{p_{i1}v_{i1}}{e_{1k}}\right) =$$

$$\sum_{k=1}^{M}\sum_{i=1}^{N}\left(\left(\frac{p_{i2k}-p_{i1k}}{e_{1k}}\right)\cdot v_{i2k}\right) + \sum_{k=1}^{M}\sum_{i=1}^{N}\left(\left(\frac{p_{i2k}}{e_{2k}} - \frac{p_{i2k}}{e_{1k}}\right)\cdot v_{i2k}\right)$$

$$\left(\sum_{k=1}^{M}\sum_{i=1}^{N}v_{i2k} - \sum_{k=1}^{M}\sum_{i=1}^{N}v_{i1k}\right)\cdot \frac{\sum_{k=1}^{M}\sum_{i=1}^{N}\left(\frac{p_{i1k}}{e_{1k}}v_{i1k}\right)}{\sum_{k=1}^{M}\sum_{i=1}^{N}v_{i1k}} +$$

$$\sum_{k=1}^{M}\sum_{i=1}^{N}v_{i2k} \cdot \sum_{k=1}^{M}\sum_{i=1}^{N}\left(\frac{p_{i1k}}{e_{1k}}\left(\frac{v_{i2k}}{\sum_{k=1}^{M}\sum_{i=1}^{N}v_{i2k}} - \frac{v_{i1k}}{\sum_{k=1}^{M}\sum_{i=1}^{N}v_{i1k}}\right)\right).$$

13. The method, as recited in claim 12, wherein the transaction data includes reference revenue and comparison revenue, wherein reference revenue is revenue at the reference time period and comparison revenue is revenue at the comparison time period, and wherein by subtracting the reference revenue from the comparison revenue a change in revenue is calculated.

14. The method, as recited in claim 13, wherein the at least one attributed causality effect includes at least one of a price effect, a volume effect, a mix effect an exchange effect, a cost effect, a dividend effect, a loss effect, and an inventory appreciation effect.

15. The method, as recited in claim 14, wherein the causality equation is defined by the change in revenue equal to a summation of the at least one attributed causality effect.

16. The method, as recited in claim 12, wherein the preparation of the transaction data includes at least one of replacing missing data and correcting data errors.

17. The method, as recited in claim 16, wherein the replacement of the missing data comprises:

identifying missing data;

determining if the missing data is price data or volume data; and if the missing data is volume data, then replacing the missing volume data with a value of zero;

else, if the missing data is price data, then determining if the missing price data is from the reference time period or the comparison time period; and if the missing price data is from the reference time period, then replacing the missing price data with price data from the comparison time period; and else, if the missing price data is from the comparison time period, then replacing the missing price data with price data from the reference time period.

18. The method, as recited in claim 12, further comprising interacting with the outputted at least one causality effect, wherein the interacting with the outputted at least one causality effect includes modifying at least one of the transaction data and the selected time periods, and iteratively analyzing revenue causality including the modified at least one transaction data and the selected time periods.

* * * * *